United States Patent
Willemin et al.

(10) Patent No.: US 9,488,543 B2
(45) Date of Patent: Nov. 8, 2016

(54) ELECTRONIC DEVICE PROVIDED WITH AUTOMATIC LEAK DETECTION MEANS

(71) Applicant: The Swatch Group Research and Development Ltd, Marin (CH)

(72) Inventors: Michel Willemin, Preles (CH); Jean-Claude Martin, Montmollin (CH); Christophe Germiquet, Preles (CH)

(73) Assignee: The Swatch Group Research and Development Ltd, Marin (CH)

( * ) Notice: Subject to any disclaimer, the term of this patent is extended or adjusted under 35 U.S.C. 154(b) by 313 days.

(21) Appl. No.: 14/167,510

(22) Filed: Jan. 29, 2014

(65) Prior Publication Data
US 2014/0230525 A1  Aug. 21, 2014

(30) Foreign Application Priority Data

Feb. 21, 2013 (EP) .................... 13156177

(51) Int. Cl.
 *G01M 3/34* (2006.01)
 *G01M 3/00* (2006.01)
 *G01M 3/32* (2006.01)

(52) U.S. Cl.
 CPC ........... *G01M 3/002* (2013.01); *G01M 3/3272* (2013.01)

(58) Field of Classification Search
 CPC ..... G01M 3/329; G04D 7/007; G04B 37/02; G04G 21/02
 See application file for complete search history.

(56) References Cited

U.S. PATENT DOCUMENTS

| | | | | |
|---|---|---|---|---|
| 2,844,271 A * | 7/1958 | Shelton | ................... | B65D 90/02 126/361.1 |
| 3,306,098 A * | 2/1967 | Kraus | ................... | G01M 3/20 73/49.3 |
| 3,355,932 A * | 12/1967 | Mulligan | ............... | G04D 7/007 73/149 |
| 3,517,547 A * | 6/1970 | Morf | ................... | G04D 7/007 73/45.5 |
| 3,792,607 A * | 2/1974 | Fukuda | ................... | G04D 7/007 73/49.3 |
| 3,793,877 A * | 2/1974 | Fukuda | ................... | G04D 7/007 73/49.3 |
| 3,802,251 A * | 4/1974 | Durr | ................... | G04D 7/007 73/1.48 |
| 4,326,408 A * | 4/1982 | Kanoh | ................... | G04D 7/007 73/49.3 |
| 4,663,964 A * | 5/1987 | Croce | ................... | G01M 3/363 73/49.3 |
| 4,934,180 A * | 6/1990 | Hulsman | ............... | G01M 3/366 73/49.3 |

(Continued)

FOREIGN PATENT DOCUMENTS

JP  2010-151656 A  7/2010

OTHER PUBLICATIONS

Akira (English Translation of Japanese Patent Application Publication JP 2010-151656 A).*

(Continued)

*Primary Examiner* — Laura Martin
*Assistant Examiner* — Samir M Shah
(74) *Attorney, Agent, or Firm* — Sughrue Mion, PLLC

(57) ABSTRACT

The electronic device is provided with an automatic leak detection means, notably for a gas leak, in the case of the device. The automatic leak detection means includes a pressure sensor, a temperature sensor and a calculation unit connected to the pressure sensor and to the temperature sensor. The calculation unit, which is a microcontroller, the pressure sensor and the temperature sensor are arranged inside the case. In operation, the microcontroller checks, based on measurements performed by the pressure sensor and the temperature sensor over time, whether the variation in pressure in the case is within a defined margin proportional to the variation in temperature to determine whether or not the case has a sufficient degree of sealing.

16 Claims, 2 Drawing Sheets

(56) References Cited

U.S. PATENT DOCUMENTS

| | | | | |
|---|---|---|---|---|
| 5,105,654 A | * | 4/1992 | Maruyama | G01M 3/363 73/49.3 |
| 5,226,316 A | * | 7/1993 | Mally | G01M 3/363 73/49.2 |
| 5,228,306 A | * | 7/1993 | Shyu | F24F 1/027 236/49.3 |
| 5,575,265 A | * | 11/1996 | Kurihara | F02M 25/0809 123/520 |
| 5,592,372 A | * | 1/1997 | Artail | G01M 17/007 700/73 |
| 5,799,639 A | * | 9/1998 | Isobe | F02M 25/0809 123/198 D |
| 2005/0270908 A1 | * | 12/2005 | Gueissaz | G04D 7/007 368/11 |
| 2009/0277251 A1 | * | 11/2009 | Takakura | F02M 25/0809 73/40.7 |
| 2013/0312494 A1 | * | 11/2013 | Nishimura | G01M 3/025 73/45.5 |

OTHER PUBLICATIONS

European Search Report of EP 13 15 6177 dated Jun. 28, 2013.

* cited by examiner

ELECTRONIC DEVICE PROVIDED WITH AUTOMATIC LEAK DETECTION MEANS

This application claims priority from European Patent Application No. 13156177.1 filed 21 Feb. 2013, the entire disclosure of which is incorporated herein by reference.

FIELD OF THE INVENTION

The invention concerns an electronic device, which is provided with an automatic leak detection means, i.e. for checking a certain sealing of an electronic device case. The electronic device may be an electronic apparatus of large dimensions or preferably a portable electronic instrument, such as a mobile telephone or watch, such as a wristwatch.

The invention also concerns an automatic leak detection method for an electronic device.

BACKGROUND OF THE INVENTION

An electronic device may be, for example, a wristwatch. This watch is formed of mechanical and electronic parts, which generally require protection from water or moisture or various gases in the environment. Leak detection, generally of gas, has to be performed to determine a degree of sealing of the watch and mainly of the case containing all the watch components. This degree of sealing is normally determined when the watch model is designed, i.e. according to the thickness of the case with the watch glass and sealing gaskets.

The watch sealing measurement can be defined as a pressure calculated in atm or hectopascals. Different degrees of sealing can be defined. For example, for hand washing with a watch worn on the wrist, the watch must be capable of withstanding a pressure of around 3 atm, which is equivalent to a pressure of around 3040 hectopascals. To take a shower or swim in a pool with the watch, the watch must be capable of withstanding a pressure of around 5 atm, which is equivalent to a pressure of around 5066 hectopascals. For diving in a swimming pool, the watch must be able to withstand at least 10 atm pressure, which is equivalent to a pressure of around 10133 hectopascals.

There exist various seal checking instruments, particularly electronic devices in the form of watches having a case. It is known to use an instrument which operates using compressed air to perform the seal test. It is possible to observe, for example, whether the watch crystal deforms when the watch is placed under pressure. If the watch crystal deforms, this indicates that the watch is well sealed, whereas if no deformation is observed, the watch is not considered sealed. This type of compressed air instrument permits a watch to be checked in similar conditions to those of normal use. An example of this type of checking instrument is one of the instruments sold under reference SM 8850-XX by Sigma Electronic SA in Bienne, Switzerland.

However, with every known type of seal checking instrument, this complicates the method of guaranteeing the proper sealing of an electronic device, such as a wristwatch. The seal checking costs for each electronic device are therefore high. Generally speaking, there is nothing provided in the state of the art to enable leak detection to be performed for an electronic device with means peculiar to the electronic device, which is a drawback.

SUMMARY OF THE INVENTION

It is therefore an object of the invention to provide an electronic device, which is provided with an automatic leak detection means, capable of overcoming the drawbacks of the state of the art, and permitting a simple and inexpensive measurement to be made of the degree of sealing of the electronic device.

The invention therefore concerns an electronic device provided with an automatic leak detection means, which is provided with an automatic leak detection means of a case of the electronic device, wherein the automatic leak detection means includes a pressure sensor, a temperature sensor and a calculation unit connected to the pressure sensor and to the temperature sensor, the calculation unit, the pressure sensor and the temperature sensor being arranged inside the case, and wherein the calculation unit is intended to check, based on measurements made by the pressure sensor and the temperature sensor over time, whether or not the variation in pressure inside the case is proportional to the variation in temperature to determine whether or not the case has a sufficient degree of sealing.

Particular embodiments of the electronic device are defined in the dependent claims 2 to 11.

One advantage of the electronic device lies in the fact that the automatic leak detection means for determining the degree of sealing of the device is formed of relatively inexpensive elements. No particular arrangement is provided for securing pressure and temperature sensors in the case of the electronic device. The two sensors may form part of the same module, which is mechanically and electrically connected across a printed circuit board. The calculation unit, which is preferably a microcontroller, is also connected to the printed circuit board for connection to the two sensors and for receiving electrical power from a voltage source, which may be a battery, cell or accumulator for an electronic device, such as a wristwatch.

Advantageously, the microcontroller is arranged to check continuously or at programmed time periods, the pressure and temperature values received by the sensors. The microcontroller checks whether the pressure variation is proportional or within a certain margin proportional to the variation in temperature inside the case. If the pressure variation deviates by a defined limit from the temperature variation, this indicates an insufficient degree of sealing of the electronic device.

Advantageously in the case of an electronic watch, the microcontroller can automatically detect whether the case has been properly closed again after a cell or battery change.

The invention therefore also concerns an automatic leak detection method for an electronic device, which is provided with an automatic leak detection means of a case of the electronic device, the automatic leak detection means including a pressure sensor, a temperature sensor and a calculation unit connected to the pressure sensor and to the temperature sensor, the calculation unit together with the pressure sensor and temperature sensor being arranged inside the case, wherein the method includes the steps of:

actuating the calculation unit, the pressure sensor and the temperature sensor, checking in the calculation unit, based on measurements performed by the pressure sensor and the temperature sensor over time, whether the pressure variation in the case is within a defined margin proportional to the variation in temperature, and determining as a function of the variation in pressure relative to the variation in temperature over time, whether or not the case has a sufficient degree of sealing.

Particular steps of the method are defined in the dependent claims 13 to 15.

BRIEF DESCRIPTION OF THE DRAWINGS

The objects, advantages and features of the electronic device and of the automatic leak detection method for the electronic device will appear more clearly in the following description, based on a simplified non-limiting embodiment illustrated by the drawings, in which.

DETAILED DESCRIPTION OF THE INVENTION

In the following description, all those electronic components of the electronic device that are well known to those skilled in the art in this technical field will be described only in a simplified manner. The electronic device may be an electronic instrument of large dimensions, where automatic leak detection is required to be performed to protect certain components placed inside the case of the instrument. Preferably, the electronic device may be a portable electronic instrument, such as a mobile telephone or a watch, such as a wristwatch.

Figure 1:
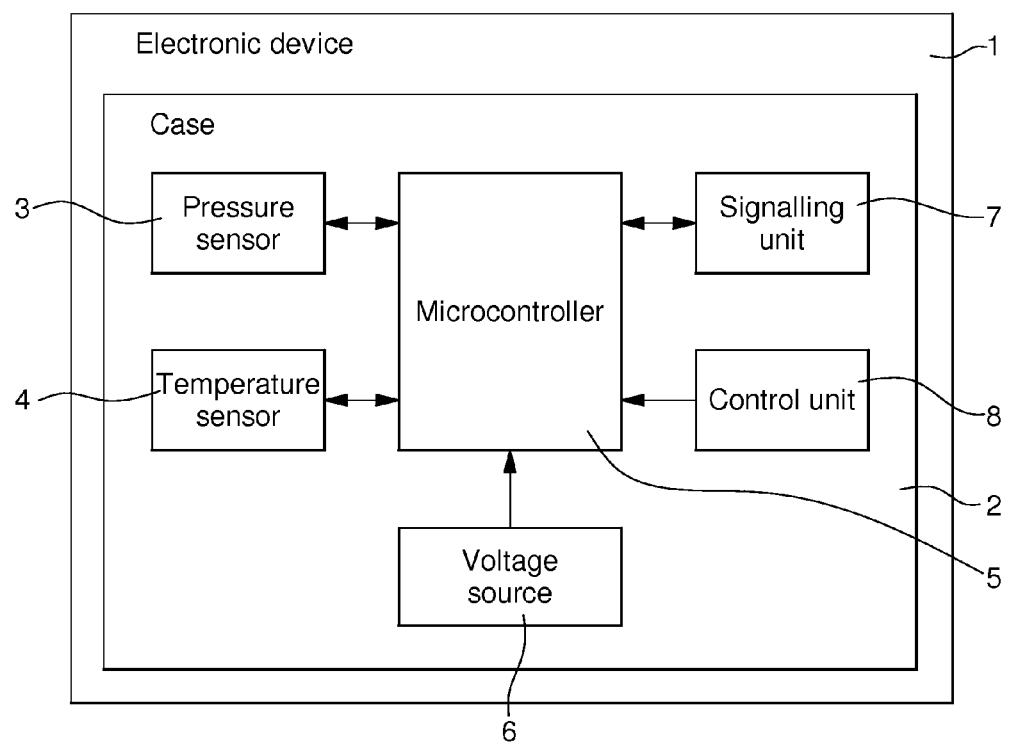
FIG. 1 shows a simplified view of an electronic device provided with an automatic leak detection means according to the invention.

FIG. 1 shows a schematic view of an electronic device 1, which may for example be a wristwatch, but is not however limited to the technical field of horology. Electronic device 1 includes an automatic leak detection means, notably for a gas leak through a case 2 of the device. This means it is possible to determine whether the electronic components of the electronic device are disposed inside a case which is normally hermetically sealed and with a sufficient degree of sealing. The detection does not guarantee that the case is totally sealed, but only indicates a degree of sealing within a determined limit. To achieve this, a temperature variation or pressure variation has to occur for the automatic detection of a leak in the case.

Generally speaking, for the automatic leak detection, electronic device 1 includes at least one pressure sensor 3 and at least one temperature sensor 4. Pressure sensor 3 and temperature sensor 4 are both connected to a calculation unit, which is preferably a microcontroller 5. The microcontroller can be electrically powered by a voltage source 6, so as also to power the two sensors 3 and 4 during their operation. This voltage source 6 may be a cell, battery or accumulator, in the case of an electronic device 1 in the form of a mobile telephone or a watch, such as a wristwatch. Microcontroller 5 and the two sensors 3 and 4 are disposed on a conventional printed circuit board, and entirely inside case 2 of electronic device 1, with no contact with the exterior.

Pressure sensor 3 and temperature sensor 4 may form part of the same electronic module. This electronic module is available on the market at a low cost. The EPCOS AG module T5400 may be used. This electronic module may easily be fixed to the printed circuit board without requiring any specific protection inside case 2. In the case of a wristwatch, the printed circuit board carrying the various electronic components is located between the watch dial and the back cover of the case, supported on an inner edge of the middle part of case 2.

Electronic device 1 further includes a signalling unit 7. This signalling unit 7 can inform or warn a user of any observed leak in the electronic device. Signalling unit 7 mainly delivers one piece of information, whether or not case 2 is considered to be sealed. For the case of a wristwatch, the signalling unit may be a display device for example an LCD or LED or OLED device or various other types of display devices. The signalling unit may also be formed by one or more hands. The hands may be conventional time indicator hands moved in a signalling mode to indicate a sealing defect. This signalling unit may also be a sound generator for generating a continuous or intermittent sound, or a vibrator.

A control unit 8 may also be provided in electronic device 1. This control unit 8 may be a control button for any type of electronic device 1. In the case of a wristwatch or a mobile telephone, this control unit 8 may be formed by one or more buttons or crowns or capacitive tactile keys. These tactile keys may be arranged underneath a watch crystal or telephone glass screen or on the periphery of the watch crystal or telephone glass screen. Control unit 8 can be manually actuated for example to activate the automatic leak detection or to obtain various pieces of information from the electronic device. However, the automatic leak detection could always be able to be actuated independently of any action on the control unit.

In microcontroller 5, the change in gas pressure inside case 2 of electronic device 1 can be checked, for example once the effect of temperature has been cancelled out. Microcontroller 5 is intended to check, based on measurements performed by pressure sensor 3 and temperature sensor 4 over time, whether the pressure variation in case 2 is proportional to the variation in temperature. This makes it possible to determine whether or not the case has a sufficient degree of sealing. Case 2 of electronic device 1 is not sealed if the change of pressure inside the case of the device is quicker than a determined limit value. The maximum internal pressure change speed allowed within the field of horology is generally 3 hours for a change from an initial pressure to the current ambient pressure.

For a gas, the gas pressure p inside the inner volume V of case 2 of electronic device 1 is set by the formula $p \cdot V = n \cdot R \cdot T$, where T is the temperature, n is the quantity of material expressed in moles, and R is the universal gas constant. To establish whether the case of the device can be considered sufficiently sealed, the variation in gas pressure inside the case must be proportional or within a defined margin proportional to the temperature variation. This means that in principle the p/T ratio must be constant for a determined period of time to ensure that case 2, for example of the watch or mobile telephone, is properly sealed. To enable the automatic leak detection to be carried out inside the electronic device of the present invention, there must be either a pressure variation or a temperature variation. Automatic detection cannot be performed effectively if there is no variation in pressure or temperature.

Generally speaking, if the p/T ratio is still constant, for example after 10 hours, watch or mobile telephone case 2 may be considered sealed. It is specified within the field of horology and NIHS standards that a watch case 2 is sealed if less than 50 µg of gas is lost per minute through the case at a pressure difference of around 2 bars between the external pressure and internal pressure. This normally means that around 3 hours are required to balance the internal pressure and external pressure as mentioned above.

If microcontroller 5 determines that the p/T ratio is no longer constant, the user of the watch or mobile telephone is informed by signalling unit 7 that the watch or telephone is no longer sealed. This measurement can be automatically performed under the control of microcontroller 5 in electronic device 1, for example every hour. In the case of a watch, a seal check may be performed at each every set time interval between 1 and 6 hours. However, microcontroller 5 may be programmed to continuously determine the variation in pressure and the variation in temperature, and to calculate, after each determined time interval, the ratio between the pressure value and the temperature value.

It is possible to envisage microcontroller 5 taking into account several pressure values and temperature values in time periods or intervals of less than one hour. These values are stored and/or the ratio between each pressure value and each temperature value with time may also be stored. The time intervals may also be on the order of one minute or several minutes. Calculating ratio p/T at each set time interval indicates whether or not the case has a sufficient degree of sealing.

In the case of a watch, such as a wristwatch, sealing gaskets are used between the parts of the case to be secured to each other. These sealing gaskets or joints, which are compressed when the back cover of the case is closed onto the middle part, do not generally ensure total sealing. Gas and mainly air can pass through these sealing gaskets over time. The sealing gaskets or joints made of plastic material are permeable. The joints may also be dirty, which unseals the case.

With a continuous monitoring by microcontroller 5, or at short time intervals, it is possible to tell quickly when the watch battery is changed, whether or not the case is closed properly. The electrical power for operating microcontroller 5 and sensors 3 and 4 to determine the degree of sealing of case 2 has a low value, which does not shorten the watch cell or battery life. The gas pressure inside the inner volume of case 2 may increase between an external ambient pressure value of 970 hectopascals prior to closure and an inner pressure value of around 1020 hectopascals, or 1100 hectopascals after the case has been closed. This means around 5% additional pressure in the inner volume of the case after closure.

If the case has not been closed properly, the inner pressure and ambient pressure are quickly balanced with a high pressure variation after only around ten seconds, or after 1 to 5 minutes, with respect to the temperature variation. This means that the p/T ratios calculated by microcontroller 5 are not constant over a short time period. A large difference in internal pressure is observed at the moment when the case is closed, and a large inverse difference in internal pressure may also be observed after closure, if the case is not closed properly or a gasket is damaged, out of position or missing. The person, normally the watchmaker, can thus be immediately informed as to whether or not the case has been properly closed to guarantee a sufficient degree of sealing of the closed case.

It is to be noted that a warning may also be provided to the person wearing the watch, if the sealing gaskets or joints are dried out or worn or have moved, which results in an insufficient degree of sealing. It is possible to replace these sealing gaskets and subsequently observe that microcontroller 5 is no longer indicating a sealing defect. If there is no indication from signalling unit 7, the person wearing the watch is assured that the watch has a sufficient degree of sealing for the application required for the watch.

The excess gas pressure inside the inner case volume after said case 2 has been closed will very slowly diminish at a constant temperature, if the watch is sealed. The pressure measured inside may be the ambient pressure within a time period which may be well beyond 10 hours and even up to a month. This is dependent on the sealing gasket of the watch. However, if after 1 hour a significant difference is observed in the pressure measured inside the watch at the same temperature, this means that the watch is no longer sealed and the user is immediately informed.

Figure 2:
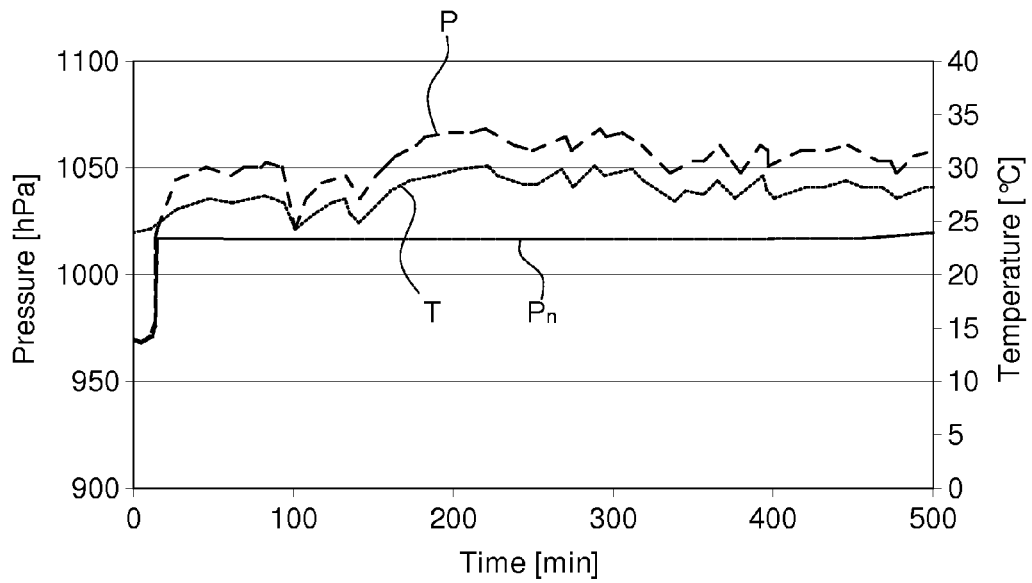
FIG. 2 shows a graph of the detected variation in pressure and temperature with time and the standardised pressure of an electronic device defined as sealed according to the invention.
Figure 3:
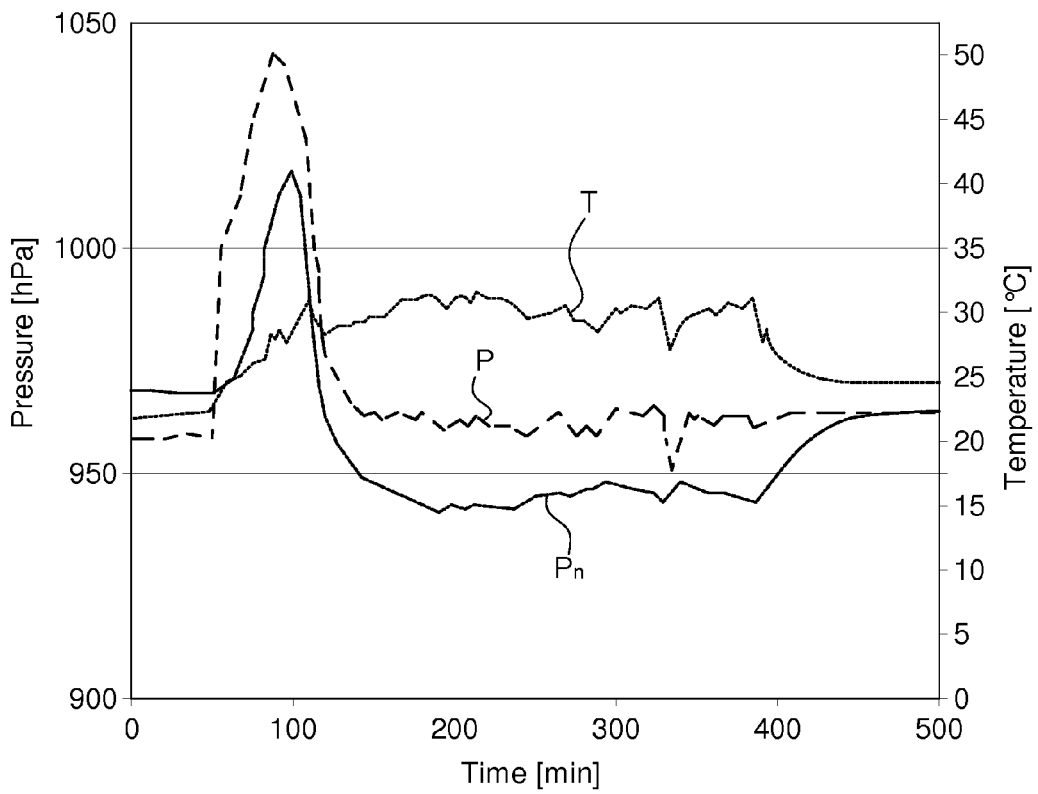
FIG. 3 shows a graph of the detected variation in pressure and temperature with time and the standardised pressure of an electronic device defined as not sealed according to the invention.

The difference between a case 2 considered to be sufficiently sealed and a case considered not to be sealed and indicated to a user is well illustrated in FIGS. 2 and 3. FIGS. 2 and 3 mainly show a graph of the variation in pressure p and variation in temperature T with time inside the case. A standardised pressure $p_n$ is determined by the microcontroller with reference to a temperature of 298° K which is a temperature of 25° C. $T_{25° C.}$. The p/T ratio between a pressure value p measured by the pressure sensor and a temperature value T measured by the temperature sensor must be equal to $p_n/T_{25° C.}$. Thus standardised pressure $p_n$ corresponds to $(p/T) \cdot T_{25° C.}$.

If the case has a sufficient degree of sealing, this standardised pressure $p_n$ will only change very slightly with time. However, if the case is not sufficiently sealed, standardised pressure $p_n$ will change with time. This means that the pressure variation is no longer proportional to the temperature variation. In these conditions, the difference between two standardised pressure values $p_n$ at two successive instants in time may be higher in absolute value than a pressure reference which defines the sufficient degree of sealing of the case. This reference may be defined for example at a value of 2 hectopascals or higher. This difference Δp is equal to a first standardised pressure value $p_n1$ at a first time t1 subtracted from a second standardised pressure value $p_n2$ at a second time t2. This pressure difference Δp may be defined each hour for example, or for time intervals of up to 6 hours so as to check whether the difference is greater or smaller than the pressure reference. However, it may also be defined as a function of shorter successive instants, as indicated above.

FIG. 2 shows a graph of the pressure variation inside a watch case and of the temperature variation with time. At the start of the measurement, the case is open notably to change a battery. The pressure is thus measured at an initial value of 970 hectopascals, which is the external ambient pressure. The temperature in this case prior to closure is around 25° C. After 20 minutes, the back cover of the case is fixed to the middle part compressing a sealing gasket, which generates excess pressure and the internal pressure is thus measured at a value of around 1020 hectopascals. Standardised pressure $p_n$ is also at a value of around 1020 hectopascals given that the temperature is 25° C.

The watch is then worn on the user's wrist, which means the temperature T will vary substantially from 25° C. to a little more than 30° C. It is noted that once the watch case has been closed, the pressure p measured by the pressure sensor varies proportionally to temperature T measured by the temperature sensor. This means that standardised pressure $p_n$ will not change noticeably for close to 8 hours following the battery change. The watch case can then be considered as having a sufficient degree of sealing.

It should also be noted that the p/T ratio determined at each time interval by the microcontroller will remain substantially constant for close to 8 hours. The microcontroller must generally take account of a temperature gradient from the temperature sensor which causes a measurement delay. Consequently, the microcontroller can perform two measurements sufficiently close to each measurement time interval to overcome this problem of delay when the p/T ratio is determined. The microcontroller can also perform a mean in time of ratios p/T or of the normalised pressure values.

FIG. 3, however, shows a graph of the variation in pressure p inside a watch case and of the variation in temperature T with time in the case of a non-sealed case. At the start, the watch case is open to change the battery. The pressure p measured by the pressure sensor is at a value of around 960 hectopascals at a temperature T close to 21° C. (294° K) measured by the temperature sensor. The normalised pressure $p_n$ is thus around 970 hectopascals. After 40 minutes, the case is closed again and the internal pressure increases to a value of around 1040 hectopascals. Temperature T also rises given that the watch is placed on a user's wrist. However, after less than 2 hours, the internal pressure p returns to a value close to the ambient external pressure of 960 hectopascals, but temperature T rises further to a value slightly higher than 30° C. The normalised pressure $p_n$ will thus rise to a maximum value of 1020 hectopascals, but will quickly drop after at least 2 hours, as the watch is not sealed.

In this case, the deviation Δp from the normalised pressure values will vary throughout the duration of the test at a higher value than the determined reference. For example, this reference may be set at a value of around 2 hectopascals. Further, the various determined p/T ratios, for each time interval defined by the microcontroller, are no longer constant. An indication can be provided in this case to the person wearing the watch to notify him of a sealing defect in the watch.

From the description that has just been given, those skilled in the art can devise several variants of the electronic device provided with automatic leak detection means without departing from the scope of the invention defined by the claims. The electronic device may be a watch, such as a diver's watch, to quickly inform the person wearing the watch as to whether or not the watch can be considered to have a sufficient degree of sealing. However, for a diver's watch considered to have a sufficient degree of sealing by the automatic leak detection means, this does not guarantee 100% sealing for performing a dive, since in these conditions account must also be taken of the deformation of the various parts of the watch as a function of depth.

What is claimed is:

1. An electronic device, which is provided with an automatic leak detection means of a case of the electronic device, wherein the automatic leak detection means includes a pressure sensor, a temperature sensor and a calculation unit connected to the pressure sensor and to the temperature sensor, the calculation unit, the pressure sensor and the temperature sensor being arranged inside the case, and wherein the calculation unit is configured to check, based on measurements made by the pressure sensor and the temperature sensor over time, whether or not the variation in pressure inside the case is proportional to the variation in temperature to determine whether or not the case has a sufficient degree of sealing.

2. The electronic device according to claim 1, wherein the calculation unit is intended to calculate, at successive time intervals, ratios between a pressure value provided by the pressure sensor and a temperature value provided by the temperature sensor inside the case, and to check whether the ratio between the pressure and the temperature remains constant at each successive time interval to determine whether or not the case has a sufficient degree of sealing.

3. The electronic device according to claim 1, wherein the calculation unit is intended to define a standardised pressure at a reference temperature based on the measurements made by the pressure sensor and the temperature sensor over time, and to calculate a difference in absolute value between the standardised pressure values, which are defined at two successive time intervals to check whether the difference is greater than or less than a pressure reference to determine whether or not the case has a sufficient degree of sealing.

4. The electronic device according to claim 1, wherein the electronic device is a watch or a mobile telephone.

5. The electronic device according to claim 1, wherein the calculation unit is a microcontroller.

6. The electronic device according to claim 5, wherein the microcontroller is powered by a voltage source disposed inside the case.

7. The electronic device according to claim 6, wherein the voltage source is a battery or accumulator.

8. The electronic device according to claim 6, wherein the microcontroller and the pressure sensor and temperature sensor are actuated at the moment of connection of the voltage source or after the actuation of a control unit.

9. The electronic device according to claim 8, which is a watch or a mobile telephone, wherein the control unit is formed by one or more buttons or crowns or capacitive tactile keys disposed underneath a watch crystal or telephone glass screen or at the periphery of a watch crystal or telephone glass screen.

10. The electronic device according to claim 1, wherein the calculation unit controls a signalling unit of the electronic device so as to indicate an insufficient degree of sealing above a determined threshold.

11. The electronic device according to claim 10, which is a watch or a mobile telephone, wherein the signalling unit is a display device or one or more hands for a watch, or a sound generator for generating a continuous or intermittent sound, or a vibrator.

12. An automatic leak detection method for an electronic device, which is provided with an automatic leak detection means of a case of the electronic device, the automatic leak detection means including a pressure sensor, a temperature sensor and a calculation unit connected to the pressure sensor and to the temperature sensor, the calculation unit together with the pressure sensor and temperature sensor being arranged inside the case, wherein the method includes the steps of:
actuating the calculation unit, the pressure sensor and the temperature sensor,
checking in the calculation unit, based on measurements performed by the pressure sensor and the temperature sensor over time, whether the pressure variation in the case is within a defined margin proportional to the variation in temperature, and
determining as a function of the variation in pressure relative to the variation in temperature over time, whether or not the case has a sufficient degree of sealing.

13. The method according to claim 12, wherein to check the variation in pressure and the variation in temperature in the case, the calculation unit calculates, at successive time intervals, ratios between a pressure value provided by the pressure sensor and a temperature value provided by the temperature sensor and checks whether the ratio between the pressure and the temperature remains constant at each successive measurement time interval to determine whether or not the case has a sufficient degree of sealing.

14. The method according to claim 12, wherein the calculation unit defines a standardised pressure at a reference temperature based on the measurements made by the pressure sensor and the temperature sensor over time, and calculates a difference in absolute value between the standardised pressure values, which are defined at two successive time intervals to check whether the difference is greater than or less than a pressure reference to determine whether or not the case has a sufficient degree of sealing.

15. The method according to claim 12, wherein a warning is given if the degree of sealing of the electronic device is determined to be insufficient and beyond a determined threshold.

16. An electronic device, which is provided with an automatic leak detection means of a case of the electronic device, wherein the automatic leak detection means includes a pressure sensor, a temperature sensor and a calculation unit connected to the pressure sensor and to the temperature sensor, the calculation unit, the pressure sensor and the temperature sensor being arranged inside the case sealed by a sealing gasket, and wherein the calculation unit is configured to check, based on measurements of the variation in pressure and the variation in temperature inside the case caused by excess pressure generated by the sealing gasket compressed and user's wearing the electronic device, made by the pressure sensor and the temperature sensor over time, whether or not the variation in pressure inside the case is proportional to the variation in temperature to determine whether or not the case has a sufficient degree of sealing.

* * * * *